United States Patent [19]

Burns et al.

[11] Patent Number: 4,518,502

[45] Date of Patent: May 21, 1985

[54] METHOD OF EXTRACTING ORGANIC CONTAMINANTS FROM PROCESS WATERS

[75] Inventors: Eugene A. Burns, Solana Beach; Bruce N. Colby, Carlsbad, both of Calif.

[73] Assignee: Maxwell Laboratories, Inc., San Diego, Calif.

[21] Appl. No.: 318,106

[22] Filed: Nov. 4, 1981

[51] Int. Cl.³ ............................................. B01D 11/04
[52] U.S. Cl. ..................................... 210/634; 210/909
[58] Field of Search ............... 210/634, 703, 909, 908; 422/260, 288, 289

[56] References Cited

U.S. PATENT DOCUMENTS

| | | | |
|---|---|---|---|
| 3,247,103 | 4/1966 | Shang | 210/21 |
| 3,449,244 | 6/1969 | Clay et al. | 210/634 |
| 3,527,699 | 9/1970 | King | 210/21 |
| 3,931,001 | 1/1976 | Winn | 210/909 X |
| 4,026,791 | 5/1977 | Wallace | 210/21 |
| 4,058,526 | 11/1977 | Mertz et al. | 544/182 |
| 4,162,902 | 7/1979 | Wiesner et al. | 55/54 |

FOREIGN PATENT DOCUMENTS 2035814 6/1980 United Kingdom ............... 210/408

OTHER PUBLICATIONS

Coulson et al., "Chemical Engineering", vol. 2, Unit Operations, 3-1979, pp. 598-601.
Kaczmarek, "A New Simple Method for the Recovery of Trace Organics from Water", NBS Pub. 464, 11-1977.

Primary Examiner—Frank Spear
Attorney, Agent, or Firm—Fitch, Even, Tabin & Flannery

[57] ABSTRACT

In a method for removing an organic contaminant from process waters, the contaminant is extracted from the water in a countercurrent extractor by a low-boiling water-immiscible solvent. The solvent extract is sparged with an inert gas to vaporize the solvent, and the raffinate is sparged with an inert gas to vaporize any dissolved solvent therefrom. Solvent is condensed from the vapors and returned to the extractor.

22 Claims, 2 Drawing Figures

METHOD OF EXTRACTING ORGANIC CONTAMINANTS FROM PROCESS WATERS

The present invention relates to methods to remove contaminants from industrial waste water and more particularly to solvent extraction of organic contaminants from process waters.

BACKGROUND OF THE INVENTION

Many industrial processes utilize large quantities of water which become contaminated with toxic organic wastes. Water carrying some contaminants, such as pesticides, at parts per million or even parts per billion levels might pose a threat to the public health and/or environment if discharged without purification. The need exists for new and better methods to remove substantially hazardous substances from water so that the water may be reused or discharged into the environment.

A known method for removing organic contaminants from water is by contacting the stream of process water with a countercurrent stream of an immiscible organic solvent in which the contaminant is more soluble than in water. Due to the expense of the organic solvent, it is important to recover it from the extract so that it may be recycled into the extraction process. A usual consequence of liquid-liquid extraction is that, due to the slight but consequential solubility of the solvent in water, the solvent itself contaminates the water and must be removed.

Prior art extraction processes have employed methods of removing the solvent from the extract and/or raffinate which require significant input of thermal energy. U.S. Pat. No. 4,162,902 describes the use of steam-stripping to vaporize the solvent from the extracted phenol. Solvents may be removed from the raffinate by steam-stripping, such as is described in U.S. Pat. No. 3,449,244 or by distillation, such as is described in U.S. Pat. No. 3,247,143. It would be desirable to have more energy-efficient methods of purifying process water.

Accordingly, it is a primary object of the present invention to provide contaminant-extraction processes which substantially remove organic contaminants from process water and recycle the solvent with minimal expenditure of thermal energy.

SUMMARY OF THE INVENTION

In a method of purifying process water, a stream of process water is fed through an extractor where a countercurrent stream of a low-boiling, water-immiscible solvent extracts organic contaminants therefrom. The solvent extract is passed through a stripper where the extract is sparged with compressed inert gas to vaporize the solvent. The water raffinate is similarly passed through a stripper where it is sparged with compressed gas to vaporize and remove any dissolved solvent from the water. Solvent is condensed from the combined vapors and recycled through the extractor while the carrier gas is recycled through the strippers. The purified water is either reused in the manufacturing process or discharged.

DETAILED DESCRIPTION OF THE PREFERRED EMBODIMENTS

Figure 1:
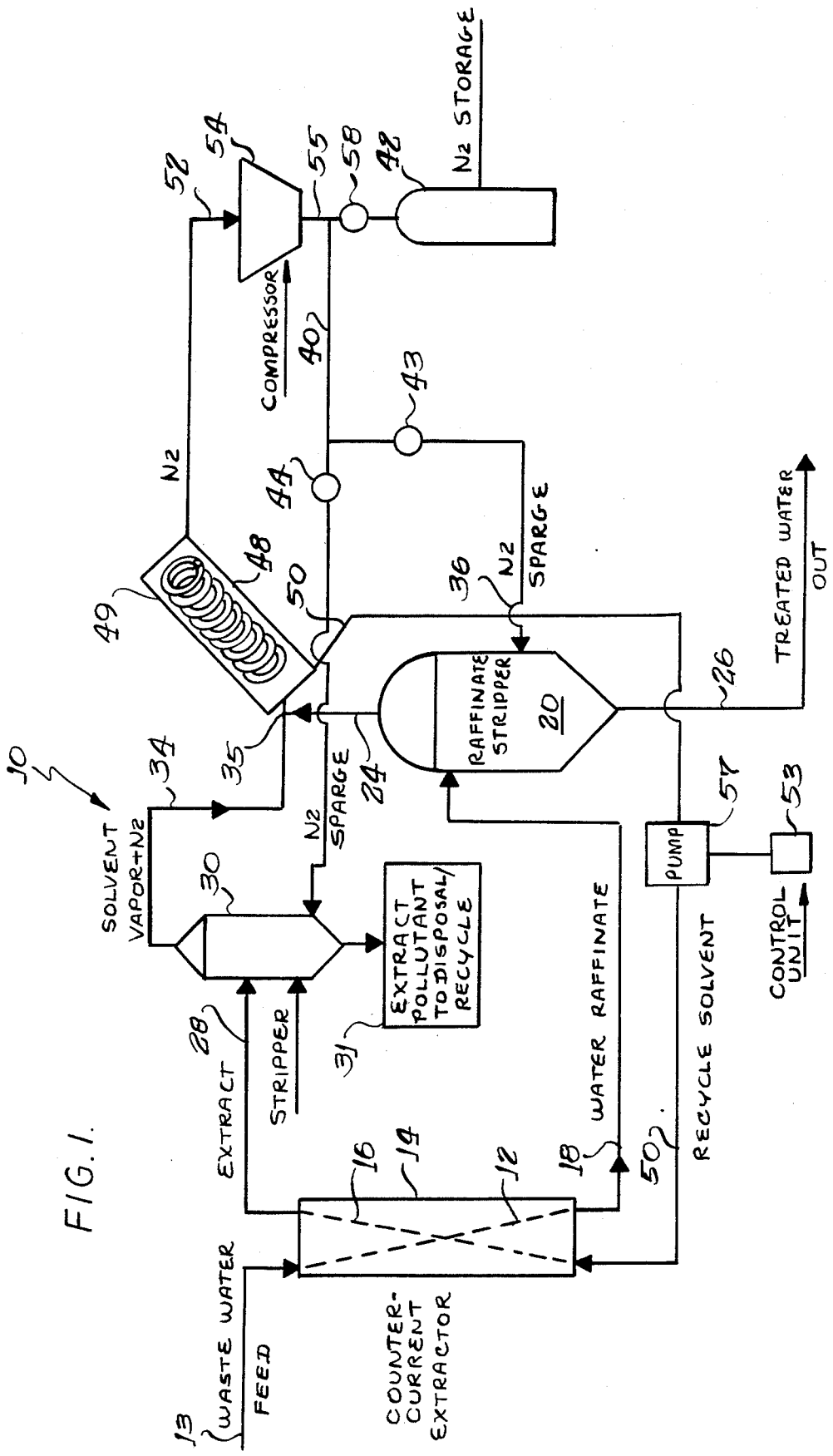
FIG. 1 is a schematic diagram of apparatus embodying various features of the invention.

A closed loop of apparatus, indicated generally at 10 is provided for removing trace level hazardous organic compounds from process water to permit recycle and reuse of the water in industrial processes or to permit discharge of sufficiently pure water. The apparatus 10, is particularly adapted for removing contaminants which are slightly soluble in water and which, at trace levels, pose a threat to the public health and/or the environment.

A stream 12 of process water containing an organic contaminant is fed through a process water inlet line 13 to an extractor 14 where it is contacted by a countercurrent stream 16 of water-immiscible solvent which extracts the contaminant from the water. The countercurrent extractor 14 may be of conventional design and adapted to the contaminant to be removed, the solvent to be used and the duration of solvent contact needed to effect efficient extraction of the contaminant from the water. For many contaminants, a single-stage countercurrent extractor 14 suffices to substantially remove the organic contaminant from the water. For contaminants which are difficult to extract, which are present in higher amounts, or which must be completely removed, stepwise extraction may be employed which more efficiently removes impurities than does a single extraction and which is achieved either by a plurality of successive extractors or by a multi-stage extractor.

The water raffinate exiting from the extractor via the line 18, while now substantially free of the contaminant, may contain significant amounts of dissolved organic solvent. The dissolved solvent itself is a contaminant that may render the water unfit for recycling through the manufacturing process, particularly in manufacturing processes where solvent vapors are combustible. Furthermore, organic solvents constitute a significant expense, and therefore, the recovery and reuse of the solvent is desired. The raffinate line 18 carries the water raffinate from the extractor 14 to a raffinate stripper 20 wherein a stream of compressed carrier gas is introduced at a lower end to sparge the raffinate. The upwardly flowing bubbles of carrier gas vaporize, leach and entrain the low-boiling organic solvent from the water, and the vapor is carried out the upper end of the stripper 20 through an upper vapor line 24, while the water, which is substantially free of both the contaminant and the solvent, is removed through a lower treated water line 26 for reuse in the manufacturing process or for discharge into the environment in sufficiently pure form.

The solvent extract is carried through an extract line 28 from the countercurrent extractor 14 to an extract stripper 30 where the extract is sparged by compressed carrier gas which enters the stripper toward its lower end and bubbles upward through the extract to vaporize, leach and entrain the solvent. For efficient use of solvent, preferably over about 90% of the solvent, and most preferably, over 95% of the solvent entering the extract stripper 30 is carried by the carrier gas through the vapor line.

The remaining solvent, containing a heavy concentration of the contaminant, is withdrawn from the bottom of the extract stripper 30 and collected in a reservoir 31. Depending on the economic value of the contaminant, the fraction containing the contaminant may either be appropriately disposed of or the contaminant may be recovered therefrom. An additional stripper (not shown) may be used to remove additional solvent from the contaminant fraction so that the contaminant may be passed back into the manufacturing process where it is recovered in the normal purification processes.

To simplify the system by obviating redundant components, the same carrier gas vaporizes the solvent in the extract stripper 30 and in the raffinate stripper 20. The vapor lines 24 and 34 from the raffinate and extract strippers 20, 30 unite at a common vapor line 35, and the gas inlet lines 36, 38 of the raffinate and extract strippers 20, 30 are supplied from a common gas line 40 leading from a gas source or storage tank 42. Each of the carrier gas inlet lines 36, 38 has its own value 43, 44 so that the flow may be separately adjusted according to the liquid inflow into the respective strippers, the gas flow to the extract stripper 30 generally being much greater than the flow to the raffinate stripper 20 because of the much greater amount of solvent to be vaporized in the extract stripper.

Because low-boiling organic solvents generally are flammable, the carrier gas is preferably flammably inert to substantially eliminate any chance of combustion of the volatile organic solvent. Nitrogen may advantageously be used as the carrier gas as it is both inert and inexpensive, although other carrier gases may also be used. The elimination, in many applications, of heaters for the strippers 20, 30 contributes to safety by further reducing the possibility of combustion of a volatile solvent.

The solvent is selected to extract readily the contaminant from the water, and to this end, the contaminant is preferably at least about 5 times as soluble in the solvent as in the water. The solvent must be substantially water-immiscible to provide a two-phase system, and the less soluble the solvent is in the water, generally the easier it is to remove trace amounts of solvent from the raffinate. An important feature of the invention is that a low-boiling solvent is selected so that it may be vaporized by a carrier gas with little or no addition of thermal energy. Preferably, the solvent has a boiling point below about 70° C. so that sparging may be carried out at or near ambient temperatures, i.e., below about 40° C. The vaporization of the solvent results in cooling of the residual liquid, and it may be desirable to supply some additional thermal energy to the system 10 so that the temperatures of the liquids in the strippers 20, 30 do not fall below an efficient sparging temperature. The heat may be supplied to the strippers 20, 30 or by heating the circulating gas or solvent. Preferably, waste heat from the manufacturing process might be utilized to maintain the liquid at a temperature where sparging is efficient. This might be accomplished, for example, by passing process water, which comes from the manufacturing process at elevated temperatures, through heat exchangers associated with the strippers 20, 30 prior to passing the process water through the extractor 14. If it is necessary to utilize a slightly higher boiling solvent, i.e., with a boiling point up to about 95°, heating units may be included in the strippers 20, 30 to provide the required thermal energy to efficiently vaporize the solvent.

The common vapor line 35 leads into a condenser 48 where the vaporized solvent is condensed from the sparge gas. The condenser 48 contains an efficient heat transfer cooling system, such as coils 49 through which water below the boiling point of the solvent flows. Ordinary tap water may be sufficiently below the boiling point of the solvent to effect efficient condensation. If external thermal energy is not used to aid the vaporization of solvent in the raffinate stripper 20, the treated water line 26 leading therefrom will carry water, which has been cooled by the vaporization of the solvent, and the water may advantageously be passed through the condenser coils. The condenser solvent is recycled through the solvent line 50 leading to the extractor 14.

A pump 57 in the solvent line 50 pressurizes the solvent and transfers the solvent to the lower end of the extractor where the lower density solvent rises in a countercurrent through the heavier water. Apparatus 53 associated with the pump adjusts the flow of solvent into the extractor 14 according to the flow of process water to the extractor so that only enough solvent is provided for complete extraction and so that excess solvent need not be vaporized and condensed later.

The carrier gas exits the condenser through an outlet line 52 and flows to a compressor 54 where it is compressed for recycling through the strippers 20, 30, and the compressed gas line 55 therefrom leads into the gas line 40 from the storage tank 42. The compressor 54 provides the driving force which recirculates the carrier gas through the system. Because there is a slow but continual loss of carrier gas from the system, a valve 58 in the line 40 from the storage tank 42 allows make-up flow from the storage tank 42 to replace continuously the gas lost from the system.

Figure 2:
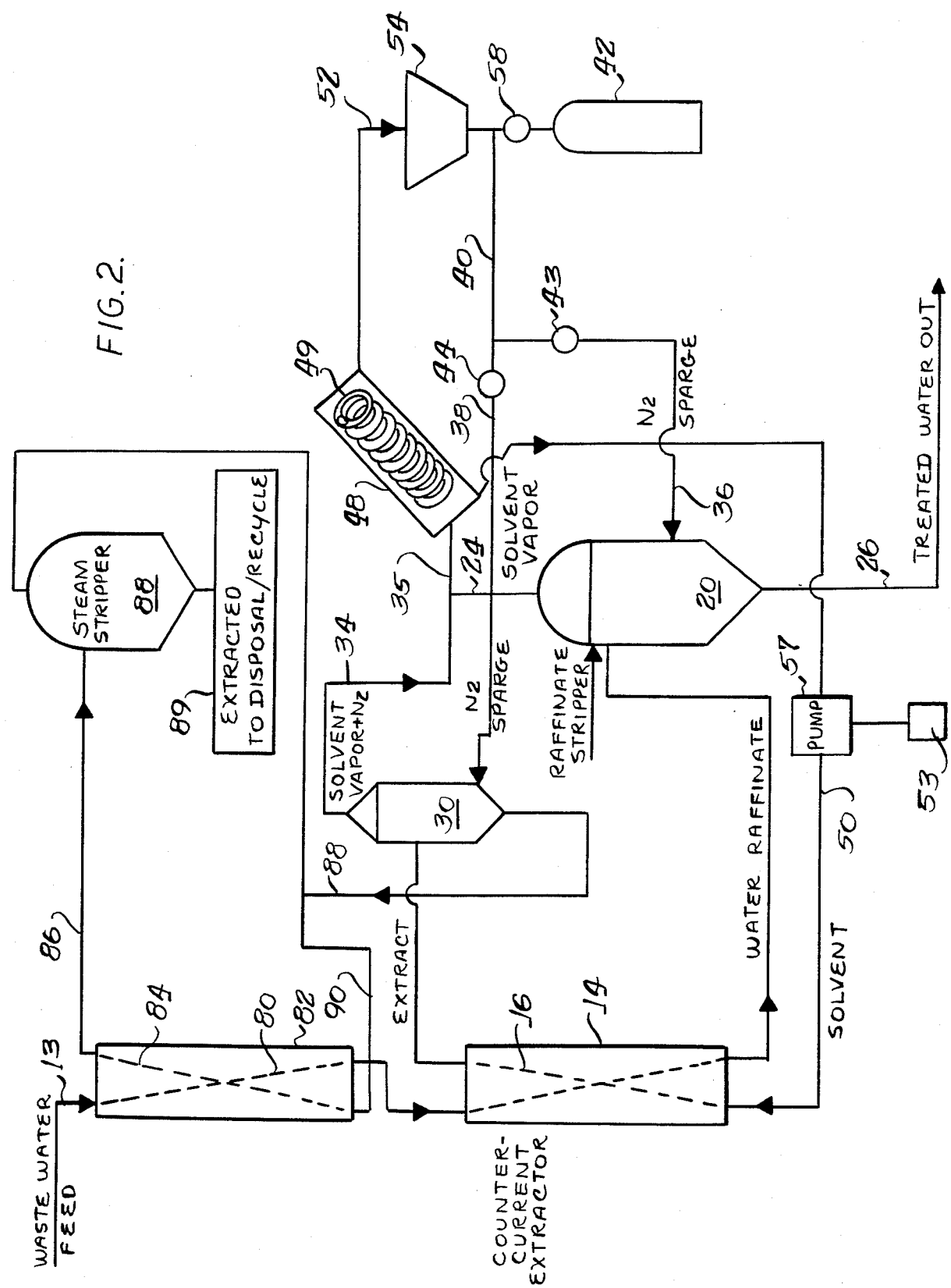
FIG. 2 is a schematic diagram of an alternative embodiment of the invention.

If a contaminant is not soluble in a practical low-boiling solvent, it may be possible to extract the contaminant with a higher boiling solvent; however, such a high-boiling solvent, if soluble to a significant extent in water, becomes itself a contaminant. While thermal energy will likely be needed to recover the high-boiling solvent from the contaminant, significant savings of energy may still be achieved in separating the high-boiling solvent from the water by an additional extraction step utilizing a low-boiling solvent. Illustrated in FIG. 2 is an alternative embodiment of the present invention in which the organic contaminant is first extracted from the water with a high-boiling solvent, and the high-boiling solvent is thereafter extracted from the water by a low-boiling solvent.

A stream of process water 80 flows through a first extractor 82 against a countercurrent stream 84 of a high-boiling, immiscible solvent. The high-boiling solvent extract is carried through an extract line 86 to a stream stripper 88 or other conventional thermal separator to separate the high-boiling solvent from the contaminant. The high-boiling solvent is recycled through the first extractor 82, and the contaminant is collected in a reservoir 89 for disposal or recycling.

The water which contains dissolved high-boiling solvent from the first extractor 82 is passed to a second extractor 14' where a countercurrent stream 16 of low-boiling solvent extracts the high-boiling solvent from the stream 12 of water. The water raffinate flows to the raffinate stripper 20 where it is sparged by nitrogen to vaporize the low-boiling solvent therefrom. The extract flows to the extract stripper 30 where it is sparged by nitrogen to vaporize the solvent in the same manner as in the FIG. 1 system. A low-boiling solvent is selected which has a boiling point at least about 50° C. lower than that of the boiling point of the high-boiling solvent for efficient separation of the solvents in the extract stripper 30. The low-boiling solvent is condensed from the vapor, and the high-boiling solvent is recycled through a line 88 leading from the lower end of the stripper 30 into the high-boiling solvent line 90 to the first extractor 82. The systems described herein may be expanded to apparatus having additional extractors in multi-step extraction procedures. Any energy savings achieved in the final step through utilization of the low-boiling solvent must be weighed against the energy expended in multiple recirculation loops. Factors affecting the overall efficiency of such systems include the relative boiling points of the various solvents and the relative solubilities of the solvents, the contaminants and the water.

Modifications of the systems may be made to particularly adapt the system for use with various solvents and for various contaminants. If the low-boiling solvent is sufficiently immiscible in the water so that negligible amounts of the solvent are dissolved in the water or if the process water, free of the contaminant, can be returned to the manufacturing process without removal of the small amount of dissolved solvent, it may be possible to eliminate the raffinate stripper. If the amount of solvent dissolved in the water is of minimal economic value so that recovery of the solvent from the raffinate is economically disadvantageous, the raffinate stripper may advantageously be replaced by a holding pond wherefrom the dissolved solvent evaporates.

The water purification apparatus described herein is a generally closed system which recycles the sparging gas, and the solvent. A relatively small amount of apparatus is needed, and accordingly, for purifying a relatively low volume of process water, i.e., less than about 5500 l./hr., all of the apparatus 10 may be mounted on a movable platform. Portability of such a system may be advantageously employed in batch processes which are run intermittently, so that the water purification unit can be moved around a manufacturing plant to purify water from successive batch processes. Such a portable unit might also be transported to a site where it is necessary to clean up a spill of an organic contaminant.

While the methods and apparatus of the invention are intended to minimize the use of external energy, it is appreciated that some amounts of energy will be expended in vaporizing the solvent, particularly in the extract stripper where substantially all of the solvent used to extract the impurity is vaporized. In the process of vaporization, whether by sparging or otherwise, the higher energy molecules escape from the liquid, resulting in a cooling of the residual liquid. Whether the solvent vaporization is accomplished by steam stripping, by distillation or by sparging with an inert gas, the heat lost by vaporization must be replenished to maintain efficient vaporization. The present invention achieves energy efficiencies through the use of low-boiling solvents, preferably with low heats of vaporization, by use of ambient thermal heat or low-energy waste heat sources, and by efficient use of the energy expended in recirculating the gas in the closed loop.

Low-boiling solvents may be efficiently vaporized by sparging with a gas at ambient or slightly elevated temperatures while the vaporization of higher boiling solvents by sparging at low temperatures is inefficient and impractical. The vaporization of low-boiling solvents without the use of external thermal sources, as are required in conjunction with such high-boiling processes such as steam stripping, distillation, etc., reduces the heat waste inherent in transferring heat from the thermal source to the liquid.

Because vaporization of low-boiling solvents, particularly those with low heats of vaporization, cools the remaining liquid less than does vaporization of high-boiling solvents, the heat needed to maintain the extract at a temperature amenable to efficient vaporization may, in some cases, be supplied from the ambient environment. If ambient thermal energy is insufficient, it may be supplemented with additional thermal energy. An ideal source of additional thermal energy is process water which has been heated in the manufacturing process. Frequently, such process water retains significant amounts of thermal energy, energy which is usually wasted because it is generally inefficient to utilize the energy from low temperature heat reservoirs. If the process water to be extracted comes from a manufacturing process at an elevated temperature, it may, for example, be run through heat exchange coils which heat liquid in the strippers 20, 30 before it is passed through the extractor 14. The cooling of the process water by using it to heat the liquid in the strippers 20, 30 may advantageously increase the efficiency of extraction if the solubility of the contaminant in the water, relative to its solubility in the solvent, decreases at lower temperatures. The cooling of the process water to a temperature close to that of the body of water, such as a stream, into which it is discharged also reduces the "thermal pollution" of the discharged water.

Energy expended to run the compressor 54 which supplies compressed gas to the strippers 20, 30 is partially converted to heat in the nitrogen as it is compressed, and this heat is transferred to the raffinate and extract as the nitrogen bubbles therethrough.

Extraction methods are efficient for removing organic contaminants with boiling points over about 120° C. Contaminants with lower boiling points tend to vaporize along with the solvent in the extract stripper.

The methods and apparatus of the invention are particularly applicable to the removal of trace contaminants in water, such as those which may be present in amounts of less than 100 parts per million. Such contaminants may be extracted from process water with a comparatively small volume of solvent, and preferably the total flow of solvent through the extractor is less than about 15% by volume of the process water through the extractor. As previously mentioned, the efficiency of the extraction may be increased by an extractor or extractors which provide for stepwise extraction.

Trace levels of organic pesticides, particularly chlorinated hydrocarbon pesticides, may advantageously be removed from process water by the methods and apparatus of the present invention. Chlorinated hydrocarbon pesticides which may be removed include, but are not limited to, DDT, DDE, BHC, TDE, methoxychlor, chlordane, heptachlor, aldrin, dieldrin, endrin, toxaphene, endosulfan and heptachlor epoxide.

EXAMPLE I

The feasibility of extracting chlorinated hydrocarbon pesticides with a low-boiling solvent is demonstrated by the following laboratory test.

Five 400 ml. volumes of water are alternately spiked with 200 ng. of heptachlor, heptachlor epoxide, DDE, DDT and dieldrin. In a 1000 ml. separatory funnel, each sample is extracted with 30 ml. of n-pentane (boiling point 36.2° C., solubility 0.036 gm/100 ml. of water at 16° C.). The pentane layer is removed and the concentrations of pesticide in the extracted pentane portions are determined by gas chromatography, and the amount of pesticide remaining in the water is determined by subtracting the amount of pesticide in the extract from the amount in the original aqueous solution. The results are summarized in Table 1 below.

TABLE 1

| Pesticide | Concentration, ppb | | Percent Extraction |
|---|---|---|---|
| | Feed | Out | |
| Heptachlor | 0.48 | .003 | 99 |
| Heptachlor epoxide | 0.46 | .005 | 99 |
| DDE | 0.37 | a | 100 |
| Dieldrin | 0.51 | .005 | 99 |
| DDT | 0.43 | a | 100 | a Below detection limit .0025 ppb

EXAMPLE II

The feasibility of extracting concentrations of pesticides in the parts-per-million range is illustrated in the following laboratory extraction. 100 ml. of water spiked with about 1500 ppb dieldrin is extracted with successive four-ml. portions of n-pentane. The concentration of dieldrin is determined for each of the pentane extract phases by electron capture gas chromatography, and the concentration of pesticides remaining in the water is calculated therefrom.

The results are summarized in Table 2.

TABLE 2

| Extraction | $V_o/V_a$ | Dieldrin Concentration (ppb) | | Percent of Available Dieldrin Extracted | Total Percent Extracted |
|---|---|---|---|---|---|
| | | Feed | Out | | |
| 1 | 0.04 | 1477. | 57.2 | 96 | 96. |
| 2 | 0.04 | 57.2 | 2.29 | 96 | 99.8 |
| 3 | 0.04 | 2.29 | 0.43 | 81 | 99.9 |
| 4 | 0.04 | 0.43 | a | b | 100. | a Below detection limit .01 ppb
b Undeterminable

The results of the above experiment illustrates that greater than 95% of dieldrin at part-per-million concentration is extracted in a single extraction and that successive extractions with low-boiling solvent portions having a total volume of less than 15% of the volume of the water, substantially removes all detectable traces of the pesticide.

EXAMPLE III

Water at 20° C. containing 5 ppm (5000 ppb) dieldrin is passed through extractor against a countercurrent of n-pentane. The flow rate of the pentane through the extractor is adjusted to be 8% of that of the water flow therethrough. The extraction is continued until 100 l. of raffinate is collected and 7.84 l. of solvent extract is collected. By gas chromatography examination of the raffinate, it is determined that the pesticide concentration remaining in the water is below detectable levels, i.e., below 0.01 ppb.

A portion of the extract is introduced into a sparging tube through which nitrogen is bubbled from a depth of 1 m. The tube is maintained in a water bath at 20° C., and additional extract is caused to flow into the tube to maintain the level of extract in the tube at 1 m. above the nitrogen inlet. Nitrogen is bubbled through the extract at a rate of 0.05 l./min. (STP), and the resulting vapors are condensed in a 0.75 m. condenser through which 10° C. water is passed. When 1 l. of pentane has been vaporized, as measured by the amount of extract needed to replenish the sparging tube, 0.92 l. of pentane is recovered at the condenser. A total volume of 500 l. nitrogen (STP) is expended to effect the vaporization of the pentane.

The raffinate is determined to contain pentane at levels of 0.03 gm./100 ml. raffinate. A liter of the raffinate is placed in a 1 m. high sparging tube and nitrogen is bubbled therethrough at a rate of 500 ml./min. Samples of raffinate are withdrawn each minute for gas chromatography analysis. The following table illustrates the change of pentane concentration with time:

| min. | Concentration of pentane (gm./100 ml.) | percent removed |
|---|---|---|
| 0 | .030 | — |
| 1 | .012 | 60 |
| 2 | .003 | 90 |
| 3 | .001 | 97 |

The above results demonstrate the efficient removal of organic contaminant by a small volume of solvent in a countercurrent extractor. Furthermore, the results demonstrate the feasibility of vaporizing low-boiling solvent extract with gas at ambient temperatures, as well as the effective removal of dissolved solvent from the raffinate at ambient temperatures.

EXAMPLE IV

Apparatus generally as shown in FIG. 1 is used to extract heptachlor from process water. The process water comes from the plant at a temperature range of about 50° C. and is passed through heat exchange coils in the extract stripper 30 and raffinate stripper 20 to heat the liquids therein prior to being passed through the extractor 14. In the extractor 14, the process water is contacted with a countercurrent stream of isohexane (B.P. 66° C.) which by the pump control 53 is adjusted to a flow rate of about 6% of that of the incoming process water.

The raffinate is sparged in the raffinate stripper 20 by $N_2$ gas which is provided at a rate of 2 l. (STP) per liter of raffinate entering the stripper 20.

A flow rate of 750 l. nitrogen per liter of extract entering the extract stripper 30 maintains the liquid level therein at a generally constant level. Sensors within the stripper determine when the extract therein rises above or falls below certain predetermined levels so that the nitrogen flow may be increased or decreased accordingly. The combined vapors are condensed at temperatures below about 15° C., a temperature which is maintained by flowing tap water, and the condensed isohexane is returned to the extractor 14 at a sufficient rate to maintain a sufficient supply of isohexane to the extractor.

The treated water is continually monitored, and at all times the heptachlor in the discharge water is less than 0.07 ppb, a concentration which may acceptably be discharged, for example, into a municipal sewer system. The level in the isohexane is at all time below 0.0002 gm./100 ml. of water, a concentration which may be acceptably discharged into a municipal sewer system.

It is calculated that the energy expended, exclusive of that supplied by the latent heat of the process water, to purify a liter of water is about 5 kcal.

It may be seen that the apparatus 10 and methods of the present invention efficiently and thoroughly remove particular organic compounds from process water.

While the invention has been described in terms of certain preferred embodiments, modifications obvious to one skilled in the art may be made without departing from the scope of the present invention.

Various features of the invention are set forth in the following claims.

What is claimed is:

1. A method of reducing the concentration of an organic contaminant which has a boiling point greater than about 120° C. and which represents an environmental hazard even at concentrations below about 100 ppm in process water to within environmentally acceptable limits comprising contacting a first stream of process water with a countercurrent second stream of a water-immiscible organic solvent having a boiling point at atmospheric pressure below about 70° C. to extract said contaminant from said water by said solvent, said contaminant being at least about 5 times more soluble in said solvent than in water and the volume of said second stream of solvent being about 15% or less of the volume of said stream of process water;

sparging a first gas stream through said contacted water from said first process water stream at a temperature below about 40° C. to vaporize dissolved solvent therefrom;

sparging a second gas stream through said solvent from said second solvent stream at a temperature below about 40° C. to vaporize said solvent from said extracted contaminant;

condensing said solvent vapors; and returning said condensed solvent to said countercurrent stream.

2. A method according to claim 1 wherein said gas, from which said solvent has been condensed, is returned to said gas streams.

3. A method according to claim 2 wherein said gas is compressed prior to being returned to said gas streams.

4. A method according to claim 1 wherein water from which said solvent has been vaporized is returned to the manufacturing process.

5. A method according to claim 1 wherein said gas is flammably inert.

6. A method according to claim 1 wherein sparging vapor from said solvent extract and sparging vapor from said contacted water are combined prior to condensing said solvent therefrom.

7. A method according to claim 1 wherein said contaminant is a chlorinated hydrocarbon pesticide.

8. A method according to claim 7 wherein said pesticide is selected from the group comprising DDT, DDE, BHC, TDE, methoxychlor, chlordane, heptachlor, aldrin, dieldrin, endrin, toxaphene, endosulfan and heptachlor epoxide.

9. A method according to claim 1 wherein heat from process water is utilized to heat said solvent extract during sparging.

10. A method according to claim 1 wherein heat from process water is utilized to heat said contacted water during sparging.

11. A method according to claim 1 wherein said contaminant is present in said process water in concentrations of less than about 100 ppm.

12. A method of reducing the concentration of an organic contaminant which has a boiling point greater than about 120° C. and which represents an environmental hazard even at concentrations below about 100 ppm in process water to within environmentally acceptable limits comprising contacting a first stream of process water with a countercurrent second stream of a water-immiscible organic solvent having a boiling point of below 70° C. to extract said contaminant from said water by said solvent, said contaminant being at least about 5 times more soluble in said solvent than in water, the volume of said stream of solvent being about 15% or less of the volume of said stream of process water;

sparging said solvent from said second solvent stream at a temperature below about 40° C. with a gas stream to vaporize said solvent from said extracted contaminant;

condensing said solvent vapor; and returning said condensed solvent to said countercurrent stream.

13. A method according to claim 12 wherein said gas from which said solvent is condensed is returned to said gas stream.

14. A method according to claim 13 wherein said gas is compressed prior to being returned to said stream.

15. A method according to claim 12 wherein said gas is flammably inert.

16. A method according to claim 12 wherein said contaminant is a chlorinated hydrocarbon pesticide.

17. A method according to claim 16 wherein said pesticide is selected from the group comprising DDT, DDE, BHC, TDE, methoxychlor, chlordane, heptachlor, aldrin, dieldrin, endrin, toxaphene, endosulfan and heptachlor epoxide.

18. A method according to claim 12 wherein heated process water supplies thermal energy to said extract during sparging.

19. A method according to claim 12 wherein said contaminant is present in said process water in concentrations of less than about 100 ppm.

20. A method of reducing the concentration of an organic contaminant which has a boiling point greater than about 120° C. and which represents an environmental hazard even at concentrations below about 100 ppm in process water to within environmentally acceptable limits comprising contacting a first stream of process water with a countercurrent second stream of high-boiling, water-immiscible organic solvent to extract said contaminant from said water with said high-boiling solvent, said contaminant being at least about 5 times more soluble in said high-boiling solvent than in water, the volume of said stream of solvent being about 15% or less of the volume of said stream of process water;

contacting said high-boiling solvent-contacted water with a countercurrent third stream of low-boiling, water-immiscible solvent having a boiling point below about 70° C. and at least about 50° C. lower than the boiling point of said high-boiling solvent to extract dissolved high-boiling solvent therefrom;

sparging said low-boiling solvent from said third stream with a gas stream to vaporize said low boiling solvent from said extracted contaminant;

condensing said low-boiling solvent vapor; and returning said condensed low-boiling solvent to said low-boiling countercurrent stream.

21. A method according to claim 20 including sparging said low-boiling solvent-contacted water with a gas stream at a temperature less than about 40° C. to vaporize said low-boiling solvent therefrom.

22. Apparatus for reducing the concentration of an organic contaminant which has a boiling point greater than about 120° C. and which represents an environmental hazard even at concentrations below about 100 ppm in process water to within environmentally acceptable concentrations, the apparatus comprising countercurrent extractor means for contacting a first stream of process water containing the organic contaminant with a countercurrent second stream of a water-immiscible solvent to extract said contaminant from said process water, said extractor means having a first outlet for the exit of the solvent and having a second outlet for the exit of the raffinate, means for circulating to said extractor means as said second stream an organic solvent, which has a boiling point below about 70° C. and in which said contaminant is at least about 5 times more soluble than in water, at a volume up to about 15 percent that of said process water, first stripper means connected to said first outlet for sparging said solvent from said second stream with gas at a temperature below about 40° C. to vaporize the solvent from the extracted contaminant, said first stripper means having a vapor outlet through which the vaporized solvent exits, second stripper means connected to said second outlet for sparging the raffinate from said first stream with gas at a temperature below about 40° C. to vaporize the solvent from the process water, said second stripper means having a vapor outlet through which the vaporized solvent exits, means for supplying sparging gas to said first and second stripper means, a common condenser connected to said vapor outlet from said first stripper means and to said vapor outlet from said second stripper means for condensing vaporized solvent from said first and second stripper means, and means for returning condensed solvent from said common condenser to said extractor means.

* * * * *